July 30, 1968 T. F. CUMMINGS ET AL 3,395,405
TRANSDUCING APPARATUS REQUIRING NO INTERRECORD GAPS ON A RECORD CARRIER
Filed June 1, 1965 2 Sheets-Sheet 1

INVENTORS
THOMAS F. CUMMINGS
GERHARD E. HOERNES
BY John F. Ostendorf
ATTORNEY

July 30, 1968 T. F. CUMMINGS ET AL 3,395,405

TRANSDUCING APPARATUS REQUIRING NO INTERRECORD GAPS ON A RECORD CARRIER

Filed June 1, 1965 2 Sheets-Sheet 2

United States Patent Office 3,395,405

Patented July 30, 1968

3,395,405

TRANSDUCING APPARATUS REQUIRING NO INTERRECORD GAPS ON A RECORD CARRIER

Thomas F. Cummings and Gerhard E. Hoernes, Poughkeepsie, N.Y., assignors to International Business Machines Corporation, Armonk, N.Y., a corporation of New York Filed June 1, 1965, Ser. No. 460,403
7 Claims. (Cl. 340—174.1)

ABSTRACT OF THE DISCLOSURE

Apparatus for transducing information from a record carrier operated in stop-start mode without normal interrecord gaps. Two transducing heads are spaced longitudinally along the carrier a distance equal to the usual length of an interrecord gap. One head normally transduces information between the carrier and utilization means while the carrier passes it. In response to a stop-start operation, the other head transduces information with respect to the portion of the carrier which passes the first head during slow down and speed up of the carrier in a stop-start operation. In one embodiment, the second head is downstream of the first head and, after start up, transduces the carrier portion missed by the first head while the first head is transducing a new carrier portion. In another embodiment, the second head is upstream from the first head and continuously transduces the portion of the carrier which approaches the first head. Information recovered by the second head is made available after start up for the portion of the carrier passing the first head during the start-stop operation.

This invention relates to information transducing apparatus and, more particularly, to transducing apparatus which permits information to be stored on a record carrier without gaps between records.

Conventional record carrier storage systems generally provide for the stored information to be recorded along the carrier as predetermined character lengths called records. Adjacent records are separated by an unrecorded portion of the carrier called the interrecord gap. The length of the gap is determined by the time duration of the stop and start operations of the system's transport mechanism. During a stop operation, a part of the carrier gap passes the transducer head after a stop signal is provided to the system and before the carrier actually stops. Thereafter, when the transport mechanism is started, another part of the carrier gap is traversed in order to achieve system speed stabilization before the information record is transduced. Thus, the only function performed by the carrier gap between adjacent records is to accommodate start-stop operations and, therefore, the gaps represent wasted portions of the carrier which cannot be used for information storage.

In the conventional systems having eighty character records, the wasted portions of the carrier are substantial as approximately one-half inch of carrier length is required for each gap. These systems have the further disadvantage of requiring a substantial amount of time for obtaining access to a particular record location. As an alternative, some systems reduce the amount of wasted carrier space by employing record blocking techniques. Use of these techniques further lengthens the accessing time required to locate a particular record. In addition, a substantial amount of programming must be built into a computer to accommodate for the blocking.

Accordingly, it is a primary object of the invention to provide improved information transducing apparatus.

It is another object of the invention to provide information transducing apparatus for use in a record carrier storage system thereby eliminating interrecord gaps from the carrier and permitting adjacent records to be butted together.

It is a further object of the invention to provide apparatus for reading information at fast accessing speeds from a carrier having records stored without any gaps between adjacent records and with less wasted carrier space than heretofore obtainable in conventional storage systems.

A further object of the invention is to provide a record carrier storage system for use in a computer which does not require extensive programming for obtaining access to individual or groups of information records.

In accordance with an aspect of the invention there is provided information transducing apparatus for use in a record carrier storage system. The apparatus comprises first and second information transducing means connected to appropriate processing and storage circuitry of a computer. The first transducer is normally operative to transduce information when the carrier is moved with respect to the apparatus. The second transducer is positioned a fixed distance from the first transducer; the distance being substantially the same as the interrecord gap of a carrier in a conventional storage system.

In the operation of the transport mechanism of the storage system, the first transducing means provides an identifying marker on the record carrier when a stop signal is provided to the system. By the time the carrier stops, the marker is located at a position between the first and second transducing means. Thereafter, on the occurrence of a start signal to the transport system, the system achieves operating speed by the time the marker reaches the second transducing means. The second transducing means detects the marker to commence transducing of the carrier at that location. At the same time, it causes the first transducing means to place a second identifying marker on the carrier. The second transducing means transduces the information with respect to the carrier until it senses the second identifying marker. At that time, it terminates operation having transduced the information within the marker bracketed region of the carrier which would be the interrecord gap on a carrier in a conventional storage system.

One feature of the invention provides for the first and second transducing means to read out the transduced information directly to the storage and processing circuitry of a computer which processes the information in the same sequential order as it is stored on the record carrier.

Another feature of the invention provides for the information to be read out from the carrier through buffering circuit arrangements and switching circuitry enabling the storage system to have a transport mechanism reversible in operation.

The foregoing and other objects, features and advantages of the invention will be apparent from the following more particular description of preferred embodiments of the invention, as illustrated in the accompanying drawings; wherein.

Figure 1:
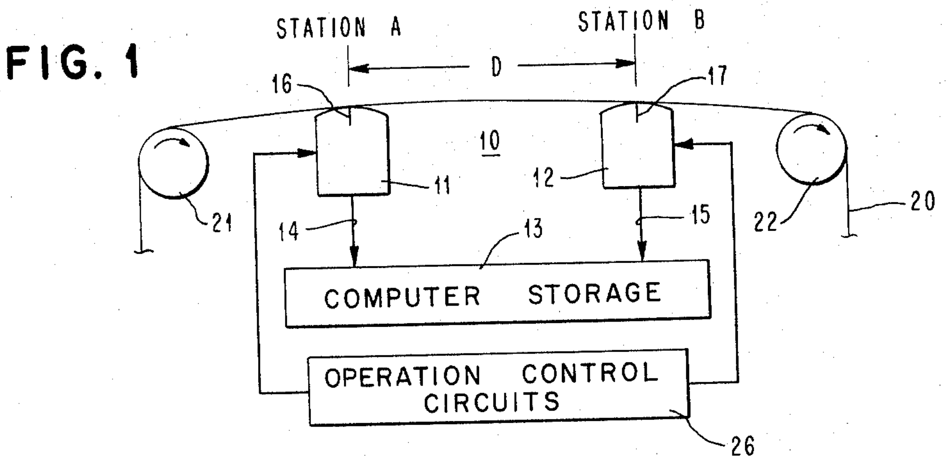
FIGS. 1 and 2 are schematic side and top diagrams of information transducing apparatus employing the principles of the invention.

Referring now to FIG. 1, the information transducing apparatus is indicated generally at 10 as comprising a pair of conventional transducing heads 11 and 12. Although the principles of the invention are applicable to both read and write transducing operations, it is preferred that the invention be used for read out applications and, accordingly, the following description will be directed to that form of operation.

Each of the read out heads 11, 12 is connected to the storage portion of a computer 13. This is accomplished through the connections 14 and 15. The transducing gaps 16, 17 of the heads 11, 12, respectively, are positioned at the stations A and B with a distance D between them. This distance approximates the normal interrecord gap distance on the carrier of a conventional storage system.

The transducing apparatus 10 is arranged to read out information stored on a record carrier 20 moving in the direction of the arrows over a pair of capstans 21–22 of a transport system. The record carrier, therefore, passes over the transducing gaps 16, 17 of the heads 11, 12.

Positioned slightly apart and to the side of the head 11 at the station A is a special head 23 for writing a special mark on a special track of the carrier. Similarly, spaced apart from the head 12 at the station B in the same longitudinal plane as the special head 23 is a head 24 for detecting the presence of the mark. Head 24 is followed by an erase head 25 in the same longitudinal plane. Heads 23–25 are indicated by dotted lines as below carrier 20 in FIG. 2. The heads 23–25 are connected to operation control circuits 26. The circuits are responsive to the stop and start operations of the transport mechanism to activate selectively the heads 23–25.

In the description of the operation of the invention it is assumed that writing of information on the carrier 20 has taken place in conventional manner. The information is stored continuously with substantially no gap between adjacent records. The writing is performed with a conventional head. If a stop signal occurs, a back space operation is initiated before the writing is continued to assure that the carrier is correctly aligned with the write head.

Figure 3:
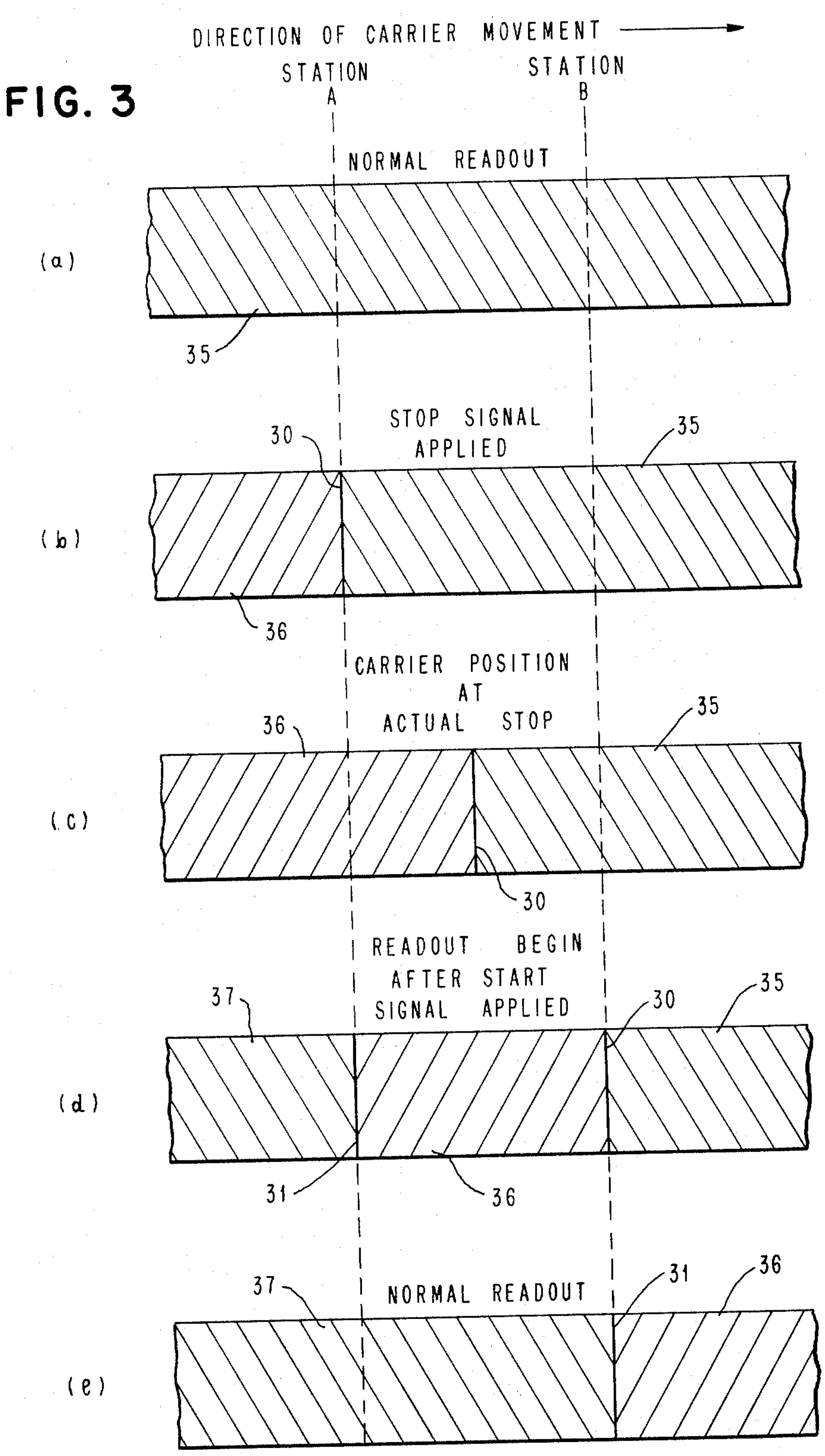
FIG. 3 is a series of schematic diagrams of a record carrier used with the information transducing apparatus of FIGS. 1 and 2 showing the various aspects of operation of the apparatus at different times.

With reference to FIG. 3*a*, during normal read out operation, head 11 of the transducing apparatus reads a record 35 at the station A. The transduced information is applied directly through the connection 14 to the computer storage 13. When a stop signal is provided to the carrier transport mechanism, the special head 23 writes a mark on a special track of the carrier 20. This mark is schematically indicated by the heavy line 30 across the carrier at the station A in FIG. 3*b*. Although this mark is shown as a solid line across the entire track, it should be understood that it is shown in this form for illustrative purposes only. In actual practice, a small mark would be provided in a special track at one side of the carrier. Since it takes a finite period of time before the carrier comes to an actual stop, the location of the line 30 is actually between the stations A and B, as shown in FIG. 3*c* when the carrier actually stops.

Thereafter, when a start signal is provided to the transport mechanism, a finite period of time is required before the transport system is running at normal operating speed. Thus, the mark 30, indicated between the stations A and B in FIG. 3*c*, approaches the station B as shown in FIG. 3*d* before the transport system achieves normal speed stabilization.

When the mark 30 advances to station B after a start signal is applied, it is detected by special head 24. Detection of this mark causes the special head 23 to write a second mark 31 in the special track of the carrier. It also activates the head 12 at station B to commence read out of the information 36 on the carrier beginning at the mark 30. The transduced information 36 is applied directly through the connection 15 to the storage 13.

This aspect of operation continues until the head 24 detects the second mark 31 (FIG. 3*e*). Head 12 is deactivated and normal read out of information 37 continues by head 11 at station A. In each instance the marks 30 and 31 are erased by the special head 25.

During the period of overlap, as shown in FIGS. 3*d* and *e*, while the head 12 is transducing the information 36 on the carrier from the mark 30 to the mark 31, the head 11 at station A begins transducing the information 37 from the mark 31 directly to the computer storage 13. The computer is programmed to accommodate the dual submission of information to its storage unit so that the information is processed sequentially.

By employing a pair of transducing heads spaced a predetermined distance apart, the interrecord gap normally required between records written on a carrier is eliminated. The records can be butted directly to one another. Additionally, any programming required for blocking a plurality of records may be eliminated from the computer system. The predetermined distance between the stations A and B is required to be at least the length of a normal interrecord gap. In conventional systems, this is approximately one-half inch. Therefore, the distance D can be approximately this distance.

Figure 4:
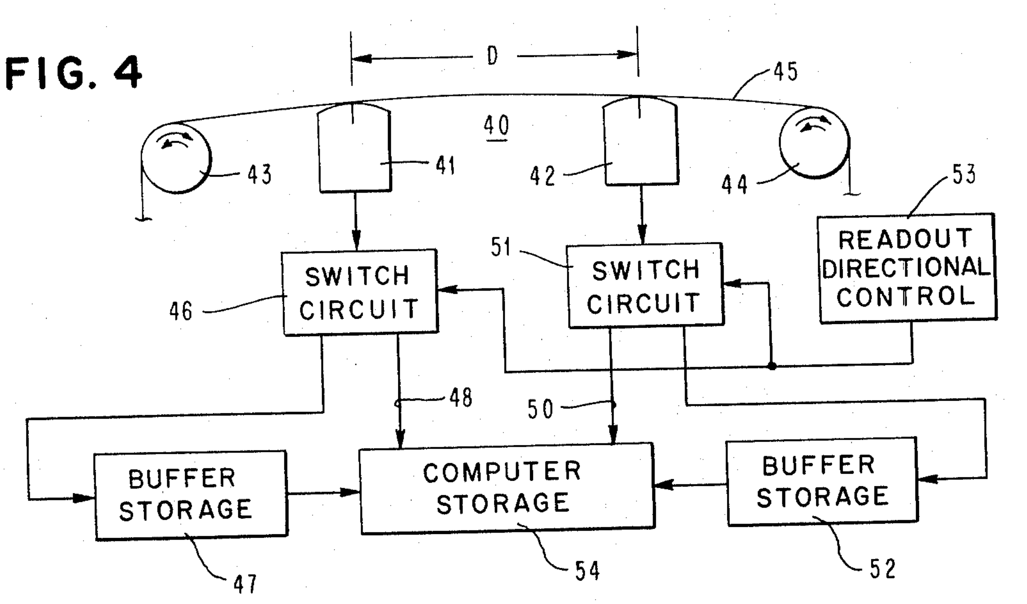
FIG. 4 is a alternate embodiment of the information transducing apparatus of the invention.

An alternate configuration of the invention is provided in FIG. 4. This configuration permits normal read out to be performed by either of the transducing heads, so that movement of the carrier can occur in either direction. This system also eliminates much of the programming required in the apparatus of FIGS. 1 and 2. To accomplish this, a buffer storage, which may take the form of a conventional delay line or shift register, is provided in the path from the first head encountering a given part of the carrier to the computer storage.

The heads 41 and 42 of the transducing apparatus 40 are positioned a distance D apart in a carrier transport system, including a pair of capstans 43, 44. The record carrier 45 passes across these capstans.

Switch circuits 46 and 51 couple heads 41 and 42, respectively, to the computer storage 54 through one of a pair of parallel circuit paths. A direct connection 48, 50 and a storage connection through buffer storage units 47, 52 are provided from switch circuits 46, 51 to computer storage 54. Only one direct connection and one storage connection are made to computer storage 54 at one time. Switch circuits 46 and 51, for establishing these connections, are operated by a read out direction control circuit 53 operating in conjunction with the carrier transport system.

When the carrier 45 in FIG. 4 is moving from the capstan 43 to the capstan 44, the switch circuit 46 connects head 41 to the computer storage 54 through the buffer storage unit 47. The direct path 48 is disconnected. At the same time, the direct path 50 from the switch circuit 51 is connected to head 42. The buffer storage path, including the storage unit 52, is disconnected.

Figure 2:
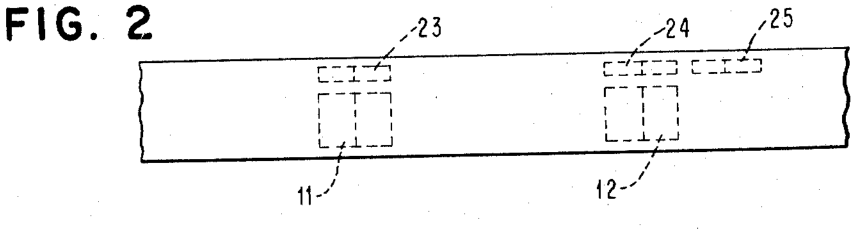

Movement of the carrier from capstan 43 to capstan 44 enables information to be normally transduced by the head 41 and applied through switch circuit 46 to the buffer storage 47 and then to the computer storage 54. When a stop signal is provided, a special head, such as that indicated in FIG. 2, provides a mark on a special track of the carrier 45. The mark advances to a position between stations A and B in the manner described with respect to FIG. 3*c*. Thereafter, when a start signal is provided to the apparatus, the head 42 commences transducing of the information when it detects the special mark written in the special track. It also causes a second special mark to be written at station A. The transduced information is applied directly to the computer storage through the switch circuit 51 and the connection 50. This operation continues until the second special mark is detected in the same manner as described for FIG. 3*e*. Normal read out by the head 41 then continues.

In this alternate system, the computer storage is not required to perform internal housekeeping to assure that the data is processed in the proper sequential order. This result is achieved by the use of the buffer storage unit in one path from the transducing apparatus. The buffer storage unit 47 is required to be emptied into the computer storage 54 prior to the time the head 42 at the station B commences transducing of information after a start signal is provided.

The apparatus operates in the same manner if the carrier moves in a reverse direction from the capstan 44 to the capstan 43. When this operation occurs, the buffer storage unit 52 performs in the same manner as the unit 47 and the direct connection 48 is enabled to pass the transduced data from head 41 to the computer storage 54.

The apparatus of FIG. 4 may also be employed in a different manner to effect elimination of the interrecord gap. In such an instance head 42 transduces the data from carrier 45. The data is coupled directly through path 50 to computer storage 54. This path acts as the main path for data to pass to storage. Head 41 continuously reads data from carrier 45 to the buffer storage 47 through switch circuit 46. When head 41 first begins to read data, the special head marks the carrier. This mark is sensed at the location of head 42. At the same time, the special head at the location of head 41 marks the carrier again and also causes the buffer to start refilling again. This process continues with the buffer storage 47 continuously storing the bracketed data. When a stop signal is provided the carrier is marked at the location of head 41 and the buffer reverts to its starting point. Upon a subsequent start signal, reading is performed from the buffer storage 47 to storage 54 until the mark is sensed at the location of head 42. At that time head 42 reads directly to the storage 54.

While the invention has been particularly shown and described with reference to a preferred embodiment thereof, it will be understood by those skilled in the art that various changes in form and details may be made therein without departing from the spirit and scope of the invention. For example, although the invention has been described as applying to the elimination of interrecord gaps between records, it is to be understood that it is applicable to any stop-start operating conditions of a carrier transport system, regardless of whether they occur between records, parts of records or blocks of records.

What is claimed is:

1. Information transducing apparatus for use with a record carrier storage system having a carrier movable longitudinally relative to the apparatus to effect information transducing between the carrier and utilization means coupled to the apparatus, comprising:

a first head for normally transducing the information when the carrier moves relative to the apparatus in a given direction, a second head positioned a predetermined distance longitudinally of the carrier from the first head for transducing information with respect to the portion of the carrier which passes the first head during a stop-start operation, and means for effecting operating control of the first and second heads during the normal and stop-start operations of the system to supply to the utilization means information transduced by the first head during normal operation and to supply to the utilization means information transduced by the second head with respect to the portion of the carrier moving past the first head during a stop-start operation.

2. Information transducing apparatus for use with a record carried transport system having a carried movable relative to the apparatus to effect information transducing between the carrier and utilization means coupled to the apparatus, comprising a first head for normally transducing the information when the carrier moves relative to the apparatus, a second head positioned a predetermined distance forward of the first head in the carrier motion direction and operative for transducing information on the occurrence of a start condition following a stop condition of the system, the second head transducing a predetermined portion of the carrier beginning at the location on the carrier moving relative to the first head when the stop condition began, and means for effecting operating control of the first and second heads during the normal and stop-start conditions of the transport system.

3. The apparatus of claim 2, and further comprising means for directly connecting the first and second heads to the utilization means thereby enabling information transducing to occur directly between the carrier and the utilization means.

4. The apparatus of claim 3, wherein the means for connecting the first head to the utilization means comprises buffering means coupled to the first head and the utilization means for temporarily retaining information transduced with respect to the carrier.

5. An information readout apparatus for use with a record carrier transport system having a carrier movable relative to the apparatus to accomplish the read out of the information stored on the carrier for use in means coupled to the apparatus, the improvement comprising a pair of read heads disposed so as to read the information stored on the carrier traversing it, one of the heads being normally operative to read the information to the using means and the other of the heads being located a fixed distance forward of the one head in the traversing direction of the carrier and operative to read a portion of the carrier substantially equal to the fixed distance after the beginning of a read operation following the termination of another read operation.

6. Apparatus for readout of information stored on a record carried traversing the apparatus, comprising a first read head positioned to read the stored information, a second read head positioned in like manner a fixed distance forward in the path of the record from the first head, utilization means coupled to the first and second heads for receiving the information read by the first and second heads, the first head being normally operative to read the information stored on the carrier and the second head being operative when the beginning of a read operation follows the termination of another read operation to read the information stored on a predetermined portion of the carrier beginning at the location of the carrier when the read operation terminated and continuing for a distance substantially equal to the fixed distance between the first and second heads, and means for effecting operating control of the heads in response to a change in read operations of the apparatus.

7. Information transducing apparatus for use with a record carrier transport system having a carrier movable relative to the apparatus to effect information transducing between the carrier and utilization means coupled to the apparatus, comprising a first head for normally transducing the information when the carrier moves relative to the apparatus, a second head positioned a predetermined distance forward of the first head in the carrier motion direction and operative for transducing information on the occurrence of a start condition of the system following a stop condition of the system, the second head transducing a predetermined distance of the carrier beginning at the location on the carrier moving past the first head when the stop condition began, and means for effecting operating control of the first and second heads during the normal and stop-start conditions of the transport system, the control means comprising first means positioned at the location of the first head for placing a first special indication on the carrier when a stop condition begins, second means positioned at the location of the second head for detecting the presence of the first special indication causing the second head to commence transducing with respect to the carrier and the first means to place a second special indication on the carrier, the second head transducing with respect to the carrier until the second means detects the second special indication.

No references cited.

BERNARD KONICK, *Primary Examiner.*

B. HALEY, *Assistant Examiner.*